(12) United States Patent
Logan et al.

(10) Patent No.: US 11,296,554 B2
(45) Date of Patent: Apr. 5, 2022

(54) FM SCAVENGING FOR WIRELESS CHARGING

(71) Applicant: Antenum, Inc., Merrimack, NH (US)

(72) Inventors: James D. Logan, Candia, NH (US); John T. Apostolos, Lyndeborough, NH (US); William Mouyos, Windham, NH (US); Jeffrey Logan, Portsmouth, NH (US)

(73) Assignee: Antenum, Inc., Merrimack, NH (US)

( * ) Notice: Subject to any disclaimer, the term of this patent is extended or adjusted under 35 U.S.C. 154(b) by 184 days.

(21) Appl. No.: 16/584,136

(22) Filed: Sep. 26, 2019

(65) Prior Publication Data

US 2020/0106306 A1     Apr. 2, 2020

Related U.S. Application Data

(60) Provisional application No. 62/822,115, filed on Mar. 22, 2019, provisional application No. 62/790,355, filed on Jan. 9, 2019, provisional application No. 62/736,956, filed on Sep. 26, 2018.

(51) Int. Cl.
*H02J 50/20* (2016.01)
*B64C 39/02* (2006.01)
*H02J 7/02* (2016.01)

(52) U.S. Cl.
CPC ............ *H02J 50/20* (2016.02); *B64C 39/024* (2013.01); *H02J 7/025* (2013.01); *B64C 2201/066* (2013.01)

(58) Field of Classification Search
CPC .......... H02J 50/20; H02J 7/025; B64C 39/024
USPC ......................................................... 320/108
See application file for complete search history.

(56) References Cited

U.S. PATENT DOCUMENTS

| | | | |
|---|---|---|---|
| 8,378,522 B2* | 2/2013 | Cook | H02J 5/005 307/104 |
| 9,826,367 B2 | 11/2017 | Mando et al. | |
| 9,917,467 B2 | 3/2018 | Jeong et al. | |
| 9,941,742 B2 | 4/2018 | Park | |
| 10,103,584 B2 | 10/2018 | Van Wageningen et al. | |
| 11,063,475 B1* | 7/2021 | Vital | H02J 50/001 |
| 2007/0087719 A1* | 4/2007 | Mandal | H01Q 1/248 455/299 |
| 2011/0159930 A1 | 6/2011 | Garrett et al. | |
| 2011/0181399 A1* | 7/2011 | Pollack | G06K 19/0717 340/10.33 |
| 2014/0008446 A1* | 1/2014 | Carr | H01Q 1/36 235/492 |
| 2016/0196455 A1* | 7/2016 | Gudan | H04B 5/0062 340/10.5 |
| 2018/0262059 A1* | 9/2018 | Apostolos | H02J 50/27 |
| 2018/0287418 A1* | 10/2018 | Zeine | H02J 50/80 |
| 2018/0337563 A1* | 11/2018 | Logan | B60L 53/12 |
| 2019/0222055 A1* | 7/2019 | Khoche | H02J 50/10 |
| 2019/0247650 A1 | 8/2019 | Tran | |

OTHER PUBLICATIONS https://www.abracon.com; "Considerations When Designing a Wireless Charging System," White Paper (Nov. 26, 2018).

* cited by examiner

*Primary Examiner* — Suchin Parihar
(74) *Attorney, Agent, or Firm* — David J. Thibodeau, Jr.; VLP Law Group LLP

(57) ABSTRACT

An apparatus, system, and method directed to the charging of electronic devices, and in particular to the wireless charging of battery enabled devices using FM band signals.

15 Claims, 15 Drawing Sheets

FM SCAVENGING FOR WIRELESS CHARGING

CROSS-REFERENCE TO RELATED APPLICATIONS

This application claims priority to U.S. Provisional Patent Ser. No. 62/736,956 filed Sep. 26, 2018 entitled "FM Scavenging For Wireless Charging", U.S. Provisional Patent Application Ser. No. 62/790,355 filed Jan. 9, 2019 entitled "FM Scavenging For Wireless Charging", and U.S. Provisional Patent Ser. No. 62/822,115 filed Mar. 22, 2019 entitled "FM Scavenging For Wireless Charging", the entire contents of each of which are hereby incorporated by reference.

BACKGROUND

Technical Field

This patent is directed to the charging of electronic devices, and in particular to the wireless charging of battery enabled devices using FM band signals.

Description of Related Art

Since the beginning of the mobile device era, users have been plagued with limited battery life and the chore of plugging their devices into a charger. While radios and wireless devices have separated the user from wires to transmit data, these devices remained chained to chargers for power.

In recent years there have been several efforts to wirelessly charge mobile devices. Power Matters Alliance (PWA) relies on magnetic induction. Basically, the PMA solution to wireless charging depends on the alignment of a transmitter coil (typically on a charging pad) and receiving coil (in the device). An alternating magnetic field generated by the transmitter coil is converted to electrical current by the receiver, and the battery recharges.

Qi, another standard, also recharges using magnetic induction.

Both of these technologies, PWA and Qi, require the device receiving power to be physically close to the charger and to be aligned with the transmitter coils. While not requiring a wire to be plugged in, they do require the user to take actions to place the device on the charger and align the device.

These solutions charge through close contact or over a short distance. They require the user to take an active step to charge and require the user to remember to charge the phone or other device periodically.

Another approach to wireless charging is to send power through the air with radio waves. There are several companies who have tried this approach, from TechNovator's XE product to Energous and Ossia. However, these technologies transmit polarized energy to the receiving device, again requiring specific orientation of the receiving device. The receiving devices also require their own specialized antennas, thus requiring additional cost and space to be taken by the charging technology.

BRIEF SUMMARY

A wireless charging system, method, and apparatus for using the energy available from a broadcast radio band, such as the Frequency Modulation ("FM") band, for charging a portable, mobile, or other electrical device.

The approach allows the battery-powered device to harvest this FM energy to perform a "trickle charge" on a variety of electronics over a period of time, so that their available power is never fully depleted or to require use in conjunction with a wired charger or charging pad.

Similar to conventional usage of an FM radio, the closer the device is to the tower transmitting the broadcast signal, the higher the received energy level, and the greater the available energy for charging.

This charging technique is particularly applicable to devices with small batteries such as smartphones, watches, hearing aids, Bluetooth speakers, toys such as mini drones, and the like. However, it can also be applied to larger devices such as battery powered scooters, electric bicycles, outdoor lighting, or battery powered equipment.

DETAILED DESCRIPTION OF PREFERRED EMBODIMENTS

Figure 1:
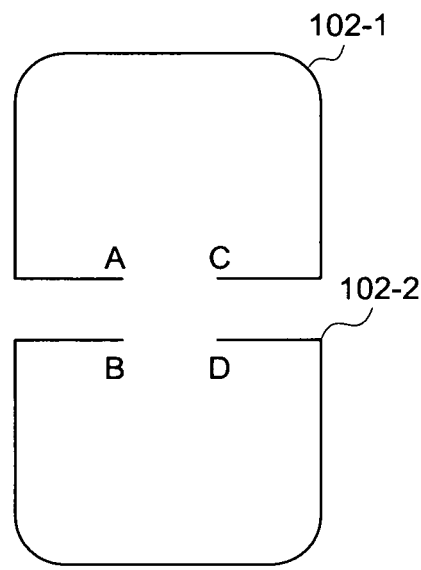
FIG. 1 is a schematic of the receive antennas.

In the wireless charging approaches described herein, the device to be charged is, generally speaking, equipped with a two semi-loop or a single full loop receiving antenna, to scavenge energy from one or more broadcast radio signals. In a preferred embodiment, the broadcast signal(s) are located in the Frequency Modulation (FM) band, such as from 88 to 108 MegaHertz (MHz) in the United States, from 87.5 to 108 MHz in Europe, from 76 to 95 MHz. in Japan, and from 65.8 to 74.0 MHz in other countries. The FM band is preferred due to the fact that in most major developed areas, strong broadcast signals are available. However, the arrangements described herein may also be applied to scavenging energy in other radio bands, such as broadcast AM or television bands. The exact frequencies and particular modulation types are not necessarily important—what is important is that the scavenged signals be relatively strong compared to background noise.

In general the receive antenna and energy detector circuits may be similar to the receive antenna and energy detectors described in U.S. application Ser. No. 15/627,779 "LOW FREQUENCY RECTENNA SYSTEM FOR WIRELESS CHARGING, and fully incorporated herein by reference. In some embodiments the receiving antenna(s) are omni directional. The antenna(s) may even, in some embodiments, provide operation independent of polarization, allowing the device to charge while being held at different angles with respect to the broadcast antenna.

I. FM Scavenging

A. Scavenging Outside Signals

The device to be charged may be a portable radio, cell phone, smart phone, PDA, tablet, laptop computer, smart watch, tag, electronic toy such as a mini drone, or another handheld device. As described in more detail later, the device to be charged may also be somewhat larger and require more energy to operate, such as may be needed in an electric scooter, electric bicycle, power tools, or the like. All of these devices to be charged are sometimes referred to herein as the "chargeable device" or the "mobile device", with the understanding that such a term may include many different types of battery-powered devices.

In one embodiment the chargeable device couples FM signals received at one or more antenna(s) and feeds those signals to a detector and rectifier circuits, which in turn provide a direct current (DC) signal usable for charging an energy storage device such as a battery.

The chargeable device, in some embodiments, may also include a scanner circuit or controller to search for and locate nearby FM signals that are stronger than others, and to control or tune the detector. The scanner may continuously scan and keep track of the frequency band of interest. As the mobile device moves to different locations, the scanner may continue to update its information and track different FM signals that are stronger than others as the surrounding environment changes. In one embodiment, the scanner includes a processor or other controller which ranks received FM signals by strength.

In some embodiments, the FM receive energy charging system may utilize more than one received FM signal and may thus utilize a separate detector and/or rectifier for each such received FM signal. The scanner may operate at such a rate as to constantly find the strongest signal(s). In one embodiment, the scanner, coupled with the processor, may continuously scan for example, for the top three FM signals. In one embodiment, the device may be equipped with three separate rectifiers which will separate convert each of the FM signals. The three converted DC voltages may then be added up and this total power then delivered to charge the battery.

FIG. 1 is a schematic of one example embodiment where two loop antennas 102-1, 102-2 are used for receiving FM signals. Each antenna component, in this embodiment, provides two respective terminals. Thus antenna element 102-1 provides terminals A and C, and antenna element 102-2 provides terminals B and D.

Figure 2A:
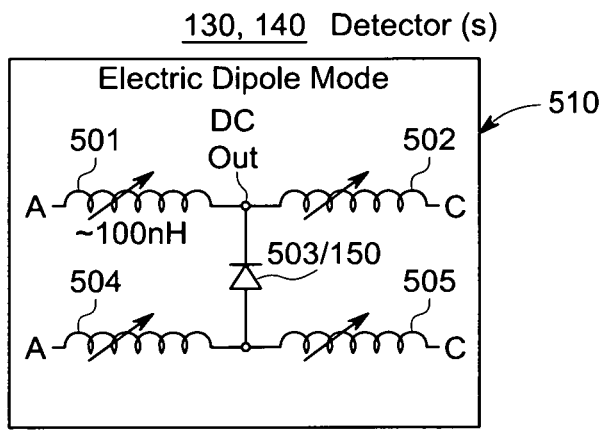
FIG. 2A is an electric dipole mode energy detector.
Figure 2B:
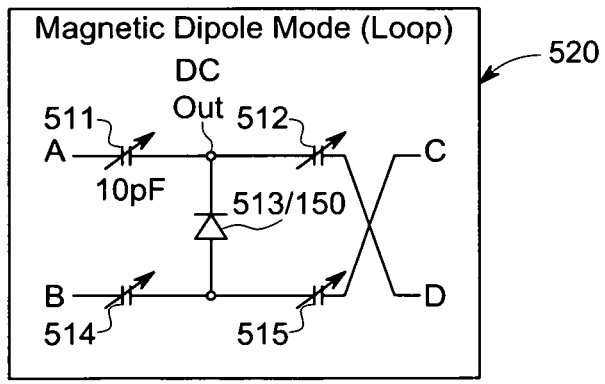
FIG. 2B is a magnetic dipole energy detector.

FIGS. 2A and 2B are schematics of two possible detector circuits, an electric dipole mode circuit 510, and a magnetic dipole (or loop) mode circuit 520 (each of which include a rectifier) to be used with the antennas of FIG. 1.

In some embodiments, a solid-state switch (not shown) chooses between two different mode networks (electric dipole or magnetic dipole) (antenna modes) chosen based on the highest signal strength. Hardware or software in the chargeable device (described as controller 160 in more detail later) tries both matching mode networks 510 and 520, and choose the mode circuit with the highest signal strength. The signal strength could vary based on the orientation of the receiving device or interference, or perhaps by the body of the user. In one embodiment, the device's accelerometers may be used to determine the orientation of the receiving device and that orientation used to choose which mode to use.

The matching networks (also referred to herein as the detector circuits) 510, 520 are designed to be as close to the impedance of the antenna elements 102-1, 102-2 as possible in order to achieve maximum efficiency. In some cases, the impedance is about 0.5 ohms.

For the electric dipole mode circuit 510, the antenna is matched with four inductors 501, 502, 504, 505, with each inductor being about 100 nano-Henry. The inductors are configured in an H structure with a diode equivalent 503 in the middle. Inductor 501 connects the A terminal on antenna 102-1, with inductor 502 then connecting to the C terminal on antenna 102-1 and the diode equivalent 503. Inductor connects the B terminal on antenna 102-2 with inductor 504, and inductor 505 connects the D terminal on antenna 102-2 to the diode equivalent 513.

Figure 3:
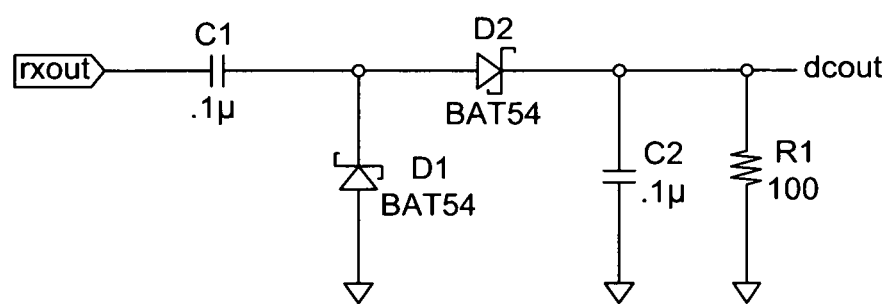
FIG. 3 is a diode equivalent rectifier circuit.

The diode equivalent 513 appears to this detector circuit 510 to be a diode, but in fact is preferably is a rectifier circuit from which the power from the antenna is tapped. One such diode equivalent circuit 503, shown in FIG. 3, includes series capacitor C1, shunt diode D1, series diode D2, shunt capacitor C2 and shunt resistor R1. The Direct Current (DC) signal fed to charge the battery is provided at the output of diode D2.

In the second mode 520, the magnetic dipole (loop) mode detector of FIG. 2B, the antennas 102-1, 102-2 are matched with four capacitors 511, 512, 513, 514, each capacitor being about 10 Pico farads. The capacitors 511, 512, 513, 514 are configured in an "HX" structure with the diode equivalent 513 (see FIG. 3) in the middle. Capacitor 511 connects the A terminal on the antenna 520 with capacitor 512 (which then connects to the D terminal on antenna 521) and the diode equivalent 513. Conductor 514 connects the B terminal on the antenna 521 with conductor 515 (which then connects to the C terminal on antenna 520) and the diode equivalent 513. The diode equivalent 513 appears to this circuit to be a diode, but actually is the rectifier circuit from which the power from the antenna is tapped.

Given that the typical smartphone uses about 0.4-0.7 watts on average, the receiver needs to receive about 5 watts to charge the device 101 in an hour (as explained more fully in U.S. patent application Ser. No. 15/627,779 incorporated by reference here). New wired chargers such as USB 2.0 Class A technologies use 3 amps at 5 or 9 or 12 volts, or up to 36 watts, allowing for a device to be charged in about 15 minutes. The receive antenna design described herein has an effective area of 1 $m^2$ because the loop antenna can resonate.

1. Drone Embodiment

The previous paragraphs are fully incorporated herein by reference. In one embodiment the antennas of FIG. 1 and detectors/rectifiers of FIGS. 2A and/or 2B may be used to power a small toy drone, as shown in the top down view of FIG. 4A. One such chargeable drone device 100 may be a Model 901H Scooter Mini Drone, and includes a main housing 180 and four rotors 190. Mounted inside the housing 180 are electronics 120 such as the aforementioned detector 130 or 140 (FIGS. 2A and 2B) and rectifier 150 (FIG. 3), and battery 170. The electronics may also contain battery conditioning circuits (not shown). A controller 160, such as a processor or programmable gate array, or hard wired logic, controls operation of the drone 100. Controller 160 thus manages turning power on or off, enables the rotors, controls charging of the battery 170, and/or accepts inputs from a user via switches or keys or in other ways. More specifically, the controller 160 also performs battery charging using the direct current (DC) voltage that is generated by the power scavenging operations described herein.

Figure 4A:
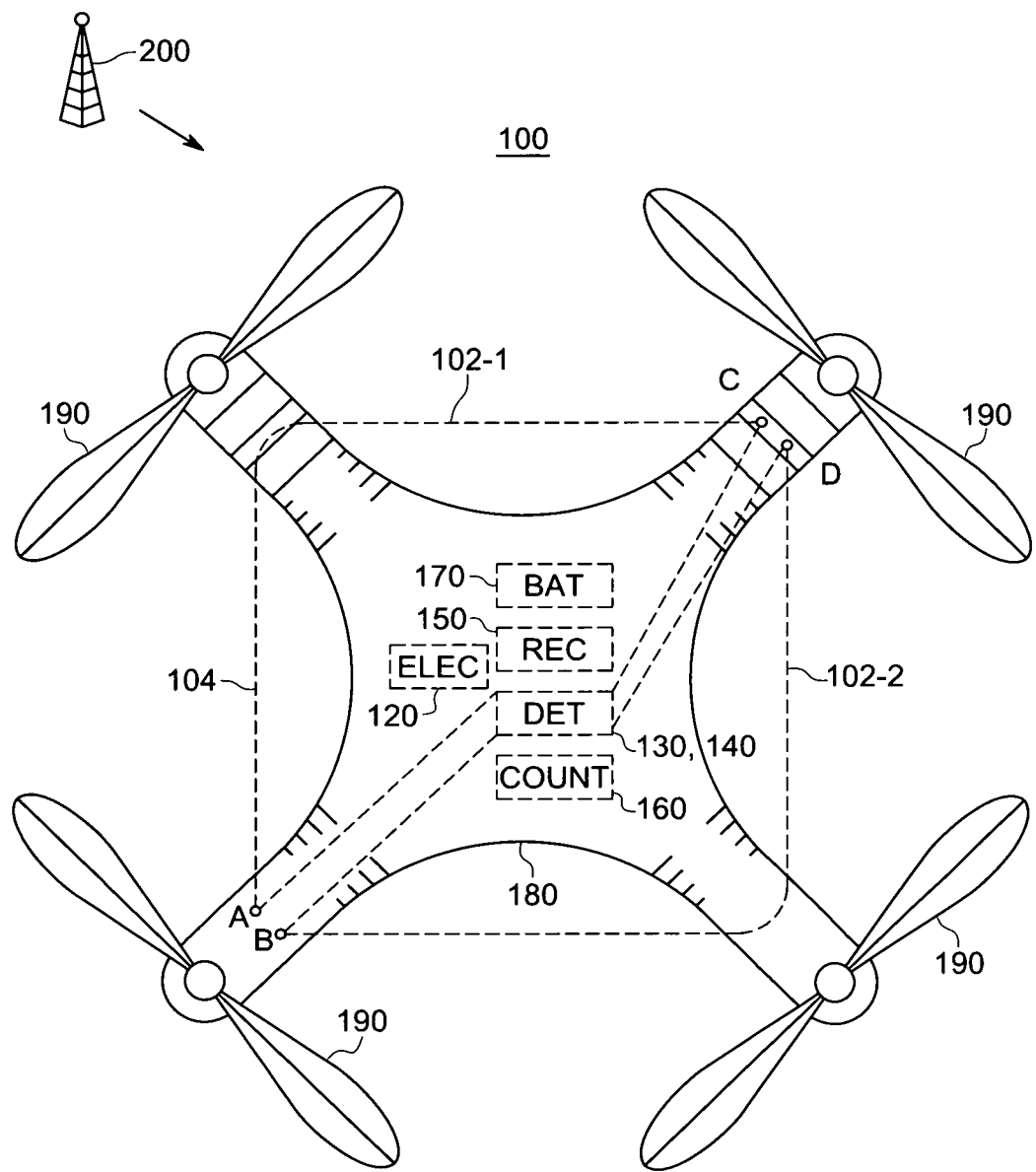
FIGS. 4A and 4B are examples of mini drones that make use of the wireless charging approach.

In the device 100 shown in FIG. 4A, the antennas are arranged around the edges of the device in a 4"×4" square. The antennas are provided by conductors, such as four metal rods, built into or supported by the housing of the drone 100. Two of the metal rods 104, such as the rods on the left and top side of the housing 180 are electrically connected to each other, in an approximate "L" shape, to provide the first antenna element 102-1 with terminals A and C at the ends thereof. Two other rods on the right and bottom sides form antenna element 102-2 with terminals B and D.

The antenna elements 102-1, 102-2 may also be provided by wires, instead of metal rods. Such wires may be supported by or disposed within structural support elements such as tubes formed of non-conductive material.

The typical lightweight toy drone 100, about 4.5"×4.5", requires perhaps 5 W of power to sustain flight. A standard lithium battery—fully charged—will provide 7 minutes of flight time before the battery needs to be recharged. The present invention to use the above described antenna to sustain the flight of the drone by scavenging the ambient FM signals. In the FM band (operating from say 88 to 108 MHz), the effective area of the antennas is approximately 1 m$^2$. Within 0.5 Km of a typical FM radio broadcast tower 200, fields incident upon the 4" by 4" sized antenna 102 elements may be expected generate approximately the desired 5 Watts at the DC output of the rectifier.

Figure 4B:
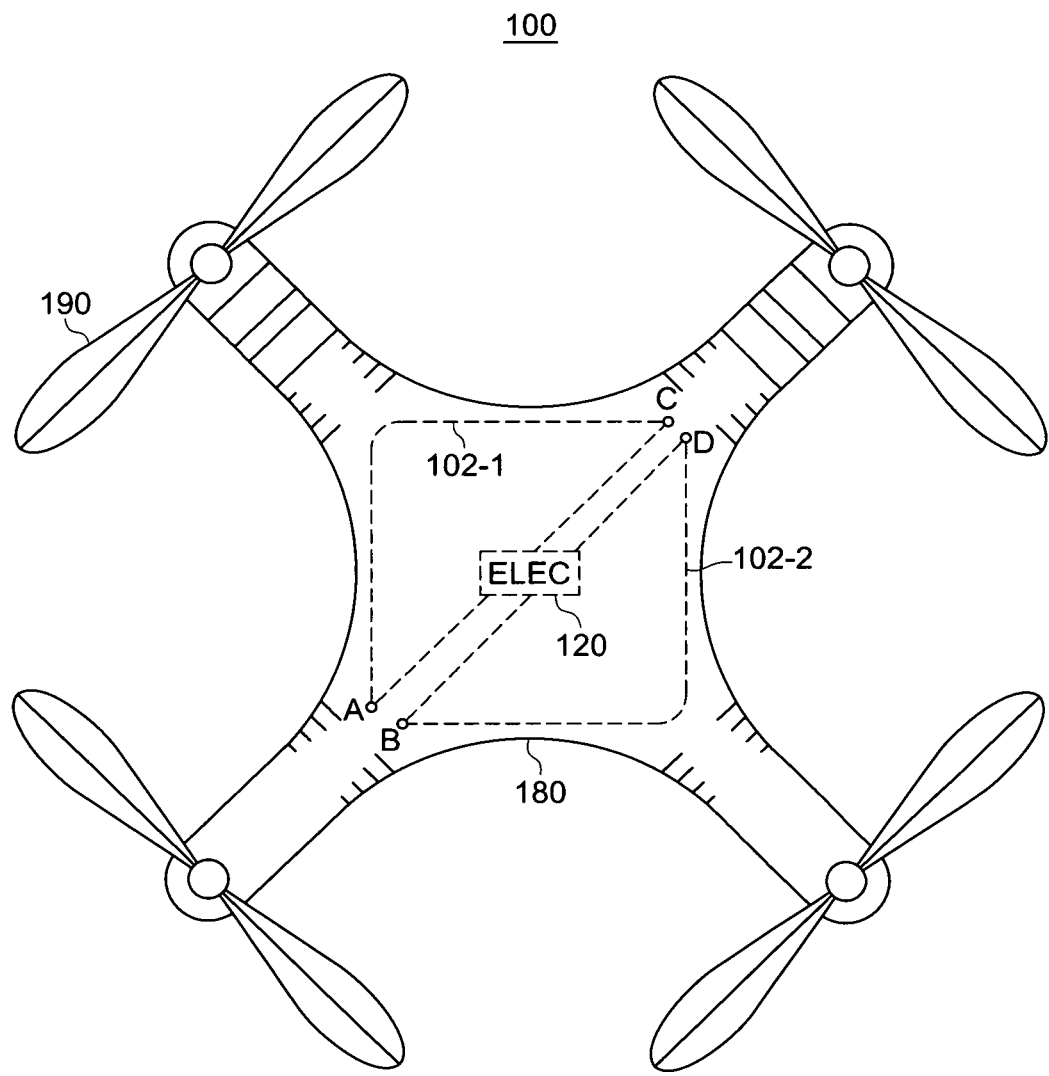

FIG. 4B is another arrangement suitable for use with the same type of drone 100 device. Here the antenna elements 102-1, 102-2 are conductors disposed within the confines of the housing 180 itself. This arrangement eliminates the need for external rods or other external support elements.

In another embodiment (not shown), the drone 100 has one or more long thin wires that are trailing behind the drone that can serve as the antenna(s).

FM Frequency Map

The United States' Federal Communication Commission ("FCC") maintains a list of broadcast FM frequencies in use, which is dependent on geographical location[1]. Consumers, when purchasing a device equipped with a suitably equipped FM scavenging device, may be enabled enter their location, such as by the zip code where the device will be used. That information can then be used to determine the availability of FM signals. In one embodiment, the subject device could have a QR code on the packaging to provide the purchaser with this type of information. A purchaser could scan the QR code prior to completing the purchase either in the store or online, and the controller 160 of the device 100 programmed with this information

[1] https://www.fcc.gov/media/radio/general-info-fm-tv-maps-data

Figure 5:
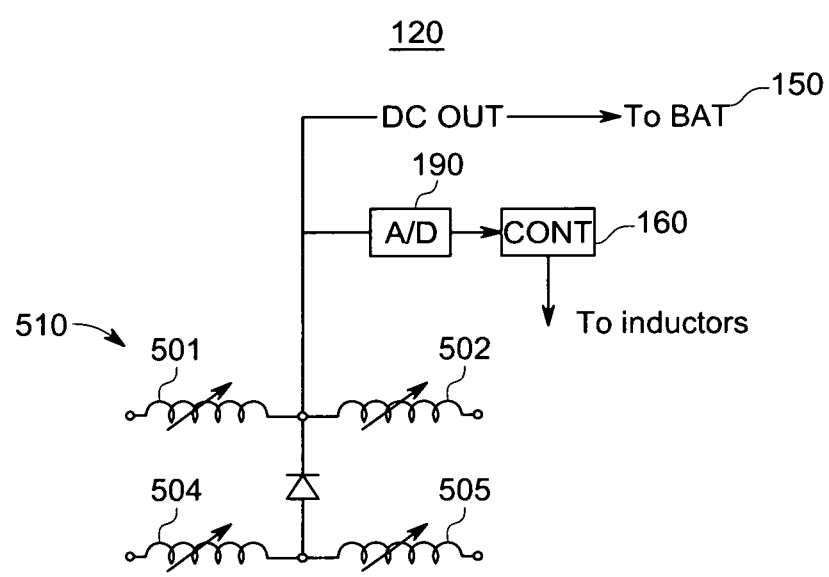
FIG. 5 is a tunable energy detector.

With a list of possible FM frequencies in hand, the electronics 120 and/or controller 160 may also perform scanning functions as mentioned previously. This function may be provided by a scanner circuit as shown in FIG. 5. Here the controller 160 monitors the energy produced by detector/rectifier circuit 510, such as via an analog to digital converter 190. The controller may then alter the exact impedance provided by the inductors 501, 502, 504, and/or 505 to change the frequency at which the detector resonates. In a preferred embodiment, all four of the inductors are adjustable. A similar arrangement, using adjustable capacitors 511, 512, 514, 515 (not shown), may also be provided for the magnetic dipole mode detector 520.

Mobile Application

Figure 6:
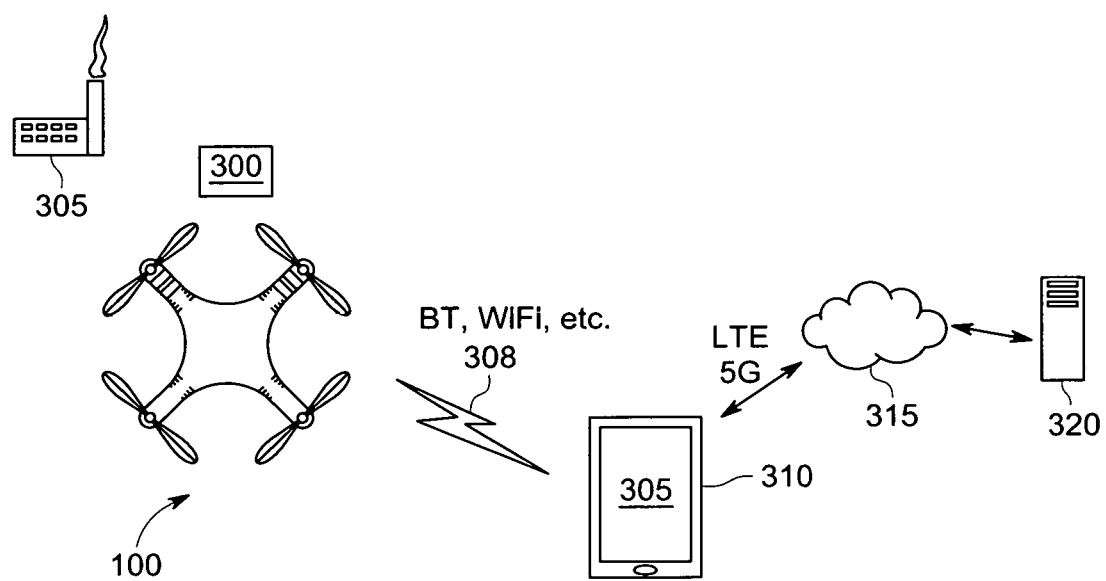
FIG. 6 illustrates different ways the device may be programmed to search for available FM or other broadcast signals.

As shown in FIG. 6, an application 300 running on a processor 160 within the device 100 may comprise executable code that contains information about the device 100 equipped with an FM scavenging antenna. Application 300 could monitor the amount of energy needed and the amount of time it takes to fully charge the device, depending on the geographical location of use, and display such information to the operator of the device 100. If a user scan a QR code on the device 100, the application 300 could provide or display specific tables of usage or specifications of the available FM energy, battery, and charging time.

A mobile application for monitoring the available battery of the device 100 may also be implemented on a second device, such as a smartphone 310. This mobile application 310, installed on a second mobile device 310, could send two-way communications to the chargeable device 100, such as via a Bluetooth or WiFi connection, to receive information on the remaining battery life. The mobile application 310 could display this to the user as a fuel gauge. Additionally, the mobile application 305 running on smartphone 310 could provide other information such as an alert to the user when the battery is fully charged or when the battery is depleted. Such an application 305 may also communicate with a server 320, using other networks such as 4G or 5G cellular network, and or use GPS information available from the smartphone to periodically query the server to obtain information about FM broadcast stations in the area in which the device 100 happens to be located.

2. Scooter Embodiment

Figure 7A:
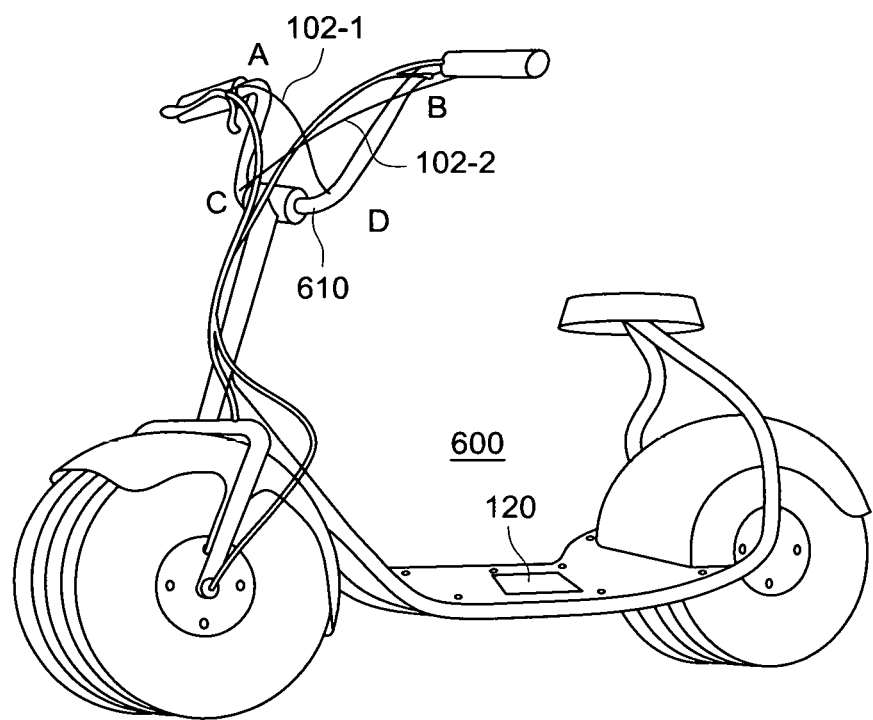
FIGS. 7A and 7B show different electric scooter embodiments.

The preceding paragraphs are fully incorporated herein. In another embodiment, the FM scavenging antenna could be installed on a battery powered scooter 600 as shown in FIG. 7A. In recent years, companies such as Bird® and Lime® have deployed battery powered scooters in cities across the United States. These scooters offer app-based scooter rides that allow you to locate a scooter, unlock it and pay for it from a smartphone, and then park the scooter at a destination.

Here, the FM scavenging antenna elements 102-1, 102-2 are s installed between the corners of the scooter's handle bars 610. The conductors forming the antenna may be metal rods, or wires supported inside non-metallic tubes.

Figure 7B:
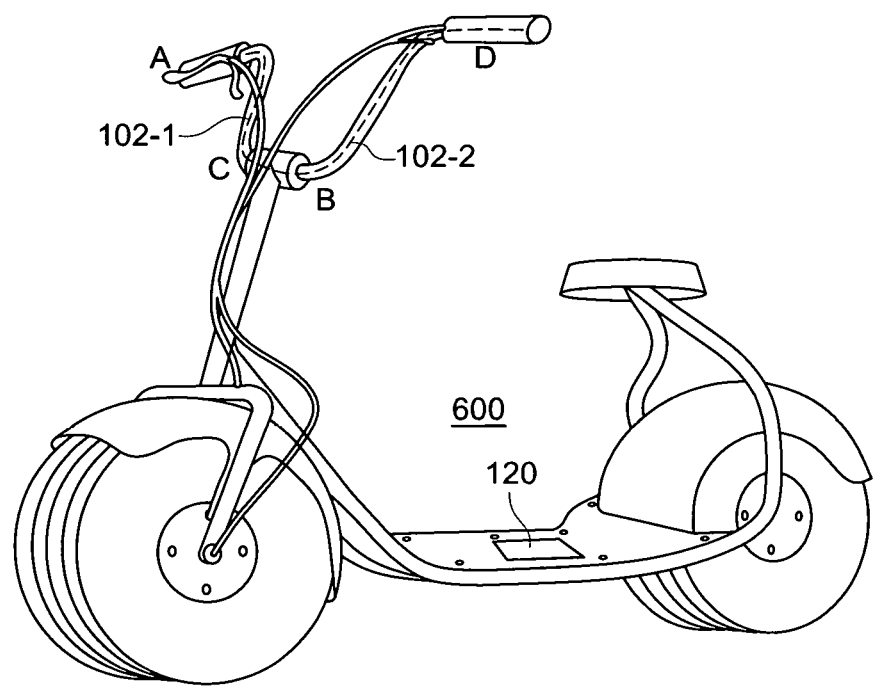

In another approach, shown in FIG. 7B, the antenna elements 102-1, 102-2 are disposed along the handle bars, or actually the handle bars themselves.

In one alternative, the entire scooter or conductive portions thereof function as the antenna (see for example FIG. 14 below).

The battery in a scooter such as a Mototec "FatBoy" is rated at 280 Watt-hours (Wh) and an overnight trickle charge could supplement or replace the need for traditional wired charging.

3. Wheel Spoke Embodiment

In another embodiment, the antenna is the wheel, or an insulated wire on the wheel, of a vehicle. The vehicle could be any number of embodiments, including a scooter, bicycle, tri-cycle, etc. As shown in the example bicycle 800 of FIG. 8, the antenna here is a single continuous loop conductor 802, such as formed by the metallic rim 810 of the spoked wheel 805, or by an insulated wire disposed along or within the rim 810. RF energy collected by the antenna 802 capacitively couples to a capacitive coupler or collector 820. The collector 820 may be held in place by a support or arm, mechanically attached to a fender 840 or otherwise held in place beside the wheel, that is mechanically attached to the fender 850 of the bicycle 800. The location of the collector arm is chosen to allow the wheel to move freely. The arm also mechanically separates the capacitive coupler 820 from the rest of the harvesting circuitry, such as rectifier(s) and detector(s) that are mounted on another place on the frame of the bicycle, away from the wheel.

Figure 8:
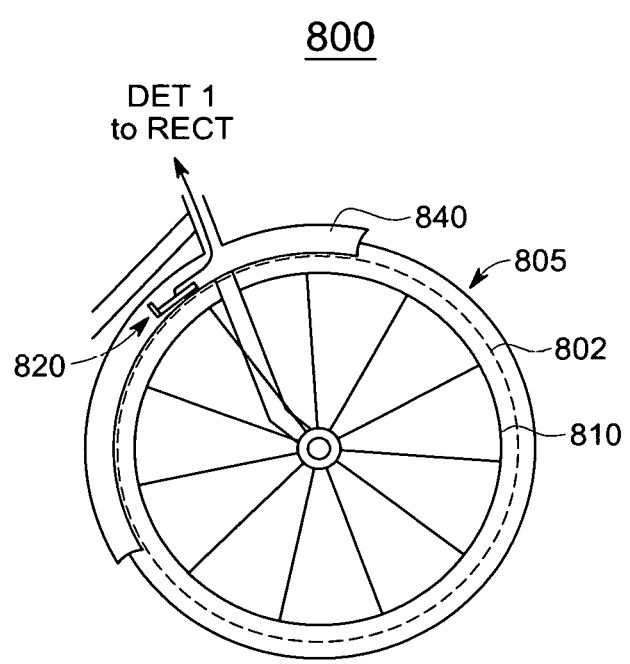
FIG. 8 is an embodiment using a spoked wheel, such as a bicycle wheel.
Figure 9:
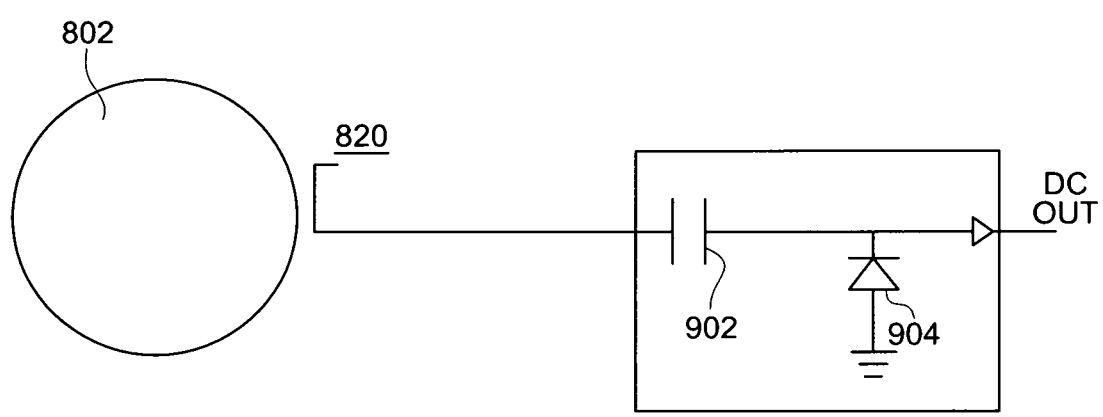
FIG. 9 is a schematic of the spoked wheel embodiment.

FIG. 9 is a schematic of the arrangement shown in FIG. 8. RF energy collected by the loop antenna 802 is fed to the capacitive coupler 820. The output of coupler 802 then feeds a detector/rectifier, which may be as simple as the single capacitor 902 and diode 904 shown. However other implementations may use the detectors and rectifiers discussed above, or variants of the same.

Figure 10:
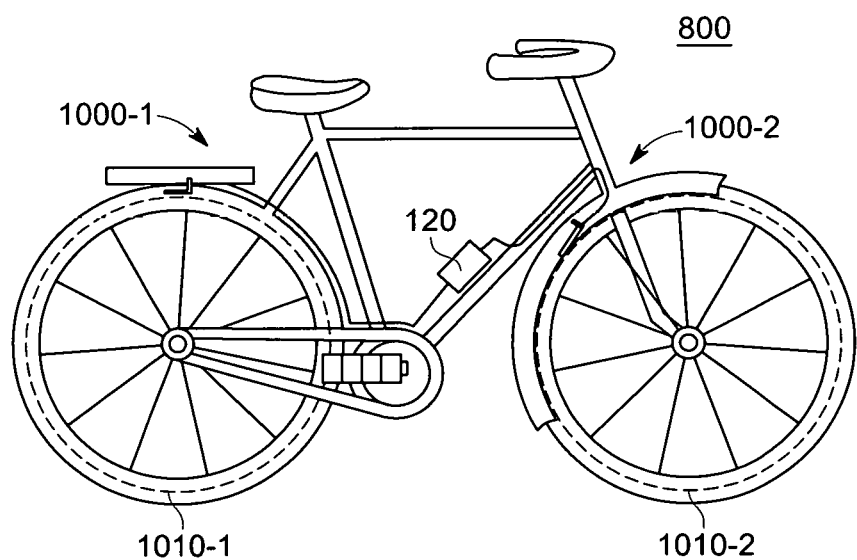
FIG. 10 is an alternative configuration of the wheel spoke embodiment.

In another embodiment, and as shown in FIG. 10, two capacitive couplers 1000-1, 1000-2 and two associated rectifier circuits can be located on the frame of the bike to collect RF energy from two antennas provided by or within each of the two wheel rims 1010-1, 1010-2. Here, the capture area of the of the RF energy surrounds both wheels.

Figure 11:
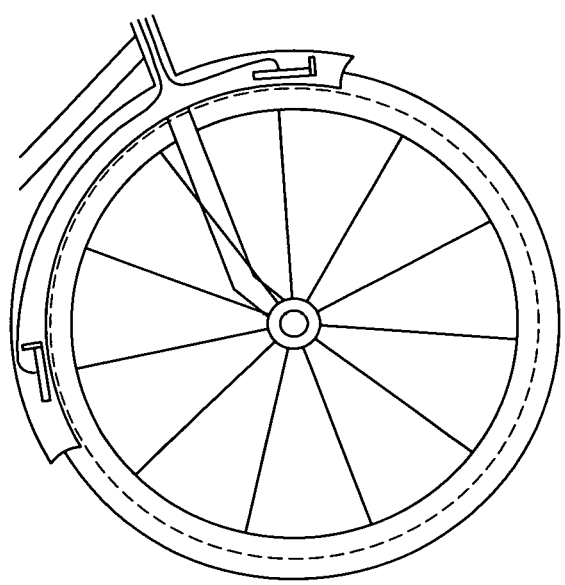
FIG. 11 is another configuration using the wheels of a bicycle.

In another embodiment, the antenna is designed so that it is split into two 180-degree segments. The antennas are formed as semi-circles around the exterior of the wheel, as shown in FIG. 11.

Figure 12:
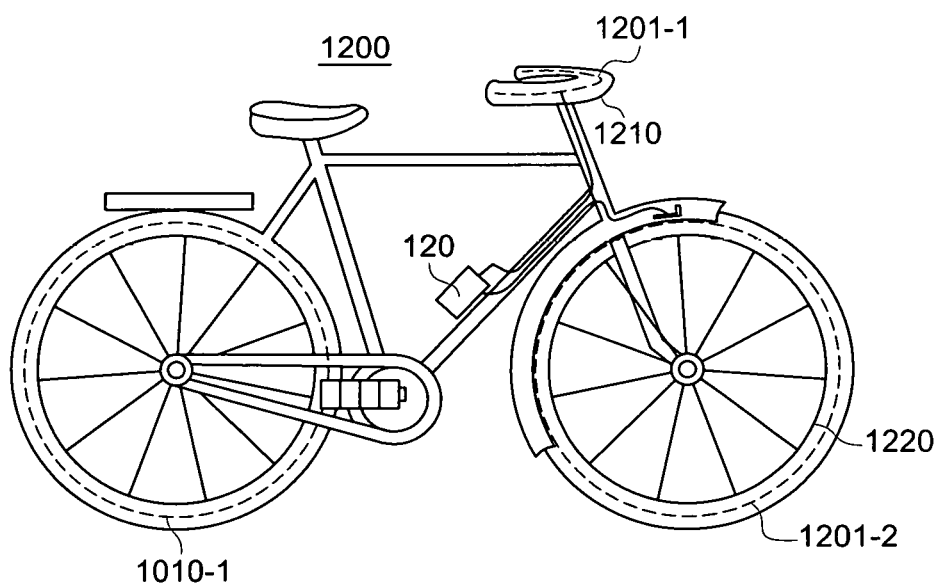
FIG. 12 is another configuration for a bicycle with handlebars.

FIG. 12 shows an antenna configuration that may collect FM energy in a way such that the bike is orientation independent. Here there is a first antenna element 1201-1 disposed within or along the handlebars 1210 and a second antenna element 1201-2 provided by or disposed within the wheel rim 1220. Respective capacitive couplers pick up RF energy from each antenna element, as before. Here the antennas are disposed in two different, approximately orthogonal, planes. Thus they provide orientation independent operation when the appropriate combining circuits are included in the electronics 120. Example combining circuits are disclosed in co-pending U.S. Patent Publication 2018/0191079 entitled "Indoor positioning system utilizing beamforming with orientation- and polarization-independent antennas", incorporated by reference herein.

In another embodiment, the vehicle does not have a fender and therefore the two capacitive couplers ("CC") are located on a separate arm disposed adjacent the wheel(s).

Figure 13A:
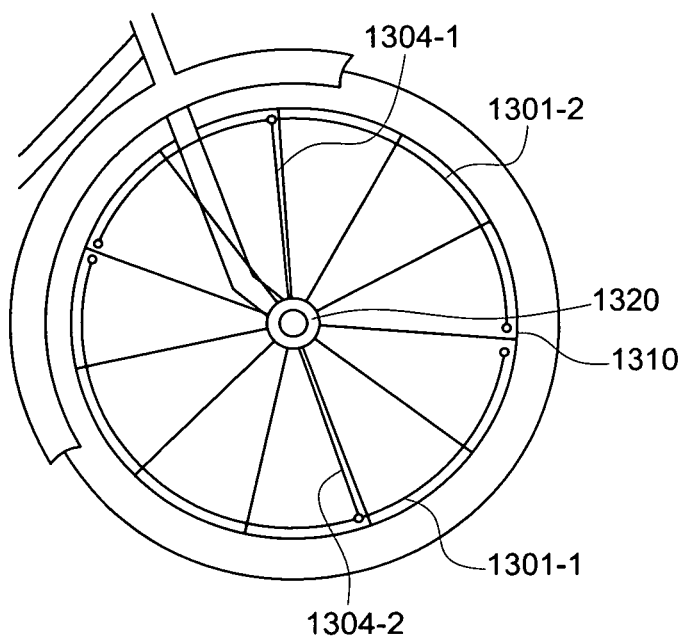
FIGS. 13A, 13B, 13C are yet another wheel spoke embodiment.
Figure 13B:
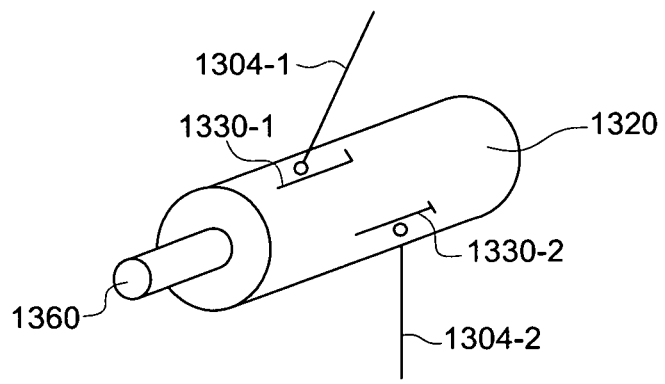
Figure 13C:
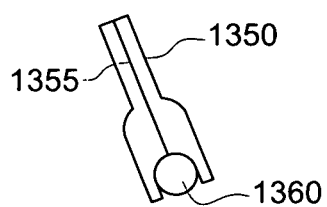

In another embodiment, the vehicle may or may not have fenders and the capacitive coupling is not performed at or along the rim, described in previous embodiments, but at the location of the axle. One example is shown in FIG. 13A. Here a pair of antenna elements 1301-1, 1301-2 are formed by or along the rim 1310 as in previous embodiments. Respective outer ends of the metallic wheel spokes 1304-1, 1304-2 electrically connect to elements 1301-1, 1301-2. FIG. 13B shows the inner ends of the spokes 1304-1, 1304-2 where they connect to axle 1320. In this arrangement, the two couplers 1330-1, 1330-2 are disposed along or within the axle 1320. The couplers could be disposed along the same axis as the axle 1320, or at 90 degrees to the axle 1320 and curved in order to each provide coupling across 180-degrees. Alternatively, both the antenna elements and the collectors may be curved. The outputs of the couplers could be merged right away within the axle, or run on separate conductors to the rectifier circuits located elsewhere on the bicycle. FIG. 13C shows how, for example, one end 1360 of the axle mechanically engages a fork 1350, and thus since these parts are metal, can provide connection to a wire 1355 that runs inside or along the fork 1350.

Figure 14:
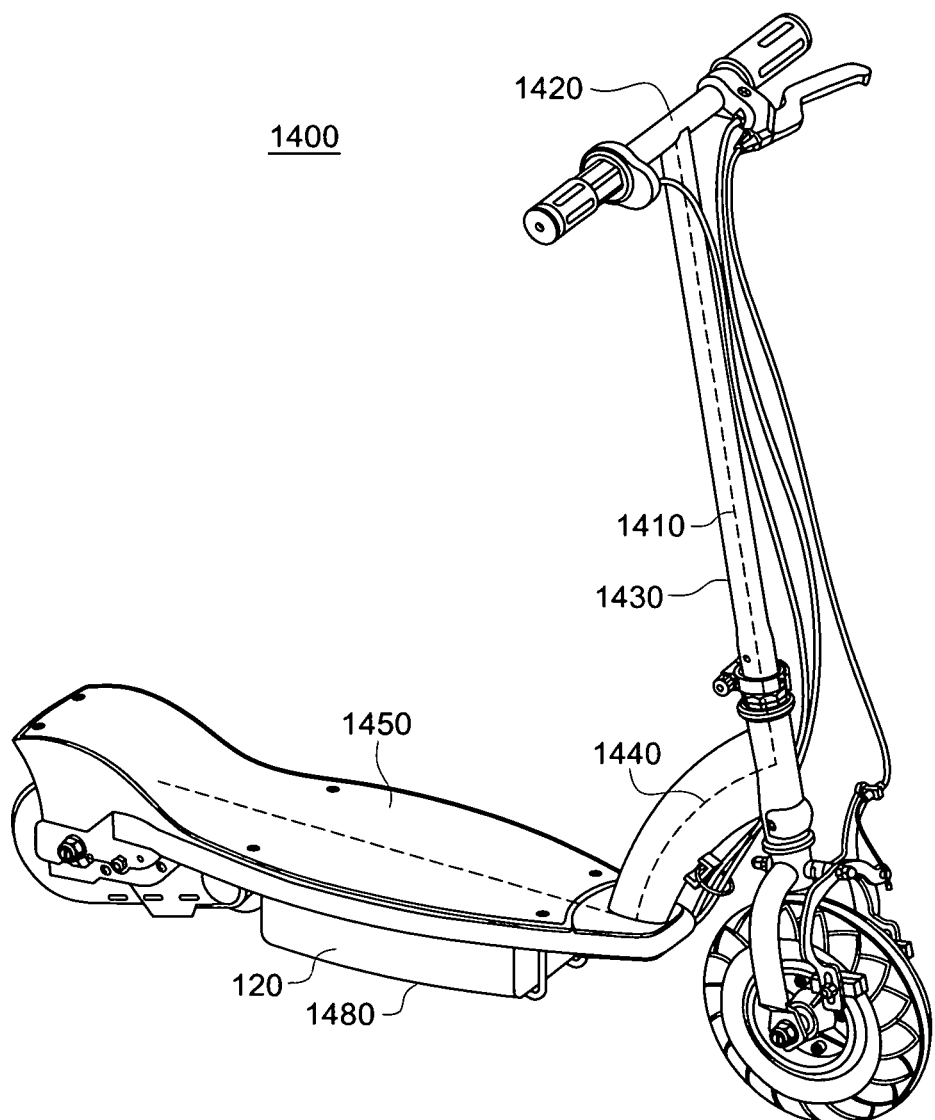
FIG. 14 is an arrangement for use with an electric scooter such as a Razor™ brand scooter.

FIG. 14 is another embodiment, showing a Razor™ brand electric scooter. Here the antenna element 1410 is a single, long wire or other conductor extending from the handlebars 1420, upright 1430, fork 1440, and deck 1450—or may even be provided by such components themselves. Connection is provided to electronics 120, including the aforementioned detectors, rectifiers and controller as may be located in a housing 1480 beneath the deck 1450.

4. Alternative Embodiments

In another embodiment, the FM scavenging antenna is installed within outdoor battery powered work equipment, including, but not limited to trimmers, edgers, blowers, lawnmowers, etc. The antennas are placed throughout the equipment or the entire device can function as an antenna. Outdoor battery-operated power equipment, including drills, hedge trimmers, blowers, etc., stored outside or in a barn or in a work truck, can utilize the invention to trickle charge while not in use or while in use to reduce the amount of battery changing. This application can be applied to any type of battery powered items that are generally stored outside, such as snowmobiles, ATVs, etc.

In another embodiment, an FM scavenging antenna is utilized in cameras, specifically outdoor security cameras that have become common in both residential and commercial applications. Outdoor security cameras, such as those marketed by Ring®, could be adapted to charge continuously with an FM scavenging antenna, to prevent constant battery replacement or having to locate the camera near an electrical outlet.

The above description of the embodiments, alternative embodiments, and specific examples are given by way of illustration and should not be viewed as limiting. Further, many changes and modifications within the scope of the present embodiments may be made without departing from the spirit thereof, and the present invention includes such changes and modifications.

B. Scavenging Indoor Signals

Another embodiment is a system for using indoor FM signals, generated by transmitters, for charging of a mobile device or the other battery powered equipment or transportation items described above.

When the mobile device or battery powered equipment is moved inside, there is not enough FM energy to scavenge for device charging. Transmitters, placed throughout the indoor structure, will flood the room with FM energy. The one or more transmitters more fully described in U.S. application Ser. No. 15/627,779 and incorporated herein by reference, a circularly polarized source antenna that can radiate in either a hemispherical pattern or directional cardiod-like patterns at a 40-50, 150, or 200 MHz frequencies. See also U.S. Patent Publication 2018/0191079 (application Ser. No. 15/861,739) entitled "Indoor positioning system utilizing beamforming with orientation- and polarization-independent antennas", previously incorporated by reference herein for example transmitter and receiver arrangements.

The transmitter is mounted in a room within the line of sight of the receiving device. However, line of sight is not required, as the radio waves will travel through walls and around other obstacles, with a loss of power that may or may not be significant depending on a number of factors.

The transmitter may also be equipped with directional phased-array antennas. The transmitter will be able to electronically steer radio waves in a desired direction. These phased-array antennas will create phase shifting in the radio frequency (RF) path to steer beams and the energy toward the device that needs to be charged. Beam steering is further described in U.S. Patent Publication 2018/0287671 entitled "Directional MIMO Antenna" which is fully incorporated herein by reference.

The transmitter that provides the RF signal may be a separate component connected to a power source such as the power grid, a generator, or a battery. In one embodiment, the transmitter is a module mounted within a wall socket.

In another embodiment, the RF transmitter is connected to a power source such as household AC power. This power could be supplied through a two or three-pronged outlet. Power could also be supplied through a screw type light socket in another embodiment, serving as an intermediary device where the transmitter has a socket for a light bulb and screws into a light socket itself.

In still another embodiment, the transmitter may take power from a hardwired smoke detector wire. In this embodiment, the transmitter could be integrated into a smoke detector, or could have mounting plates and power socket to mount the smoke detector below the transmitter.

In another embodiment, the transmitter may be hardwired to the household AC power, or could be used as an interface to a ceiling fan (or incorporated into a wireless fan itself). With the fan interface, the transmitter is mounted to the ceiling fan, and the ceiling fan mounts to the ceiling, with the transmitter serving as a mechanical and electrical interface between the fan and the ceiling.

The transmitters can have one or more of the following controls to adapt to changing conditions within the room and safely provide FM signals.

1. IR Sensor

The transmitter may be coupled to an infrared (IR) sensor to modulate the level of energy that the transmitters emits. If something moves close to the IR sensor then the transmitter may decrease the transmitted FM signal sent into the room.

2. Near Field Effect

Another feature of the transmitter uses circuitry to measure the standing wave ratio of the reflection. The transmitter detects the reflection energy from different items in the room to determine the distance from a person to the transmitter. As someone moves closer to the transmitter the power of the FM signal is lowered. A detector such as a Voltage Standing Wave Ratio (VSWR) meter may then may also be coupled to the transmitter to detect variations.

When such variations are detected, it may be concluded that these variations are caused by the presence of a small animal or other undesired object which has come near the transmitter. In this instance the controller may cause RF generator to shut down or reduce its transmitted RF power. At the same time, the controller may sound an alarm, activate a visual indicator, send a text message or activate an application on a mobile phone of the operator of the mobile device, or initiate some other indication that obstruction exists within the charging equipment. When the detector indicates the disturbance is removed, and/or the operator indicates a safe condition again exists, the controller may then again operate the RF generator as normal.

3. Signal Detection

Another feature of the transmitter is the ability to detect near-field communication (NFC), Bluetooth, or Wi-Fi (or similar wireless protocol) which in turn are used to detect the presence, location, and identity of the mobile device(s) in a room or other nearby location. Once a device is detected, beam steering can be used to direct the FM energy in the direction of the device for efficient charging, such as described in U.S. Patent Publication 2018/0191079 entitled "Indoor positioning system utilizing beamforming with orientation- and polarization-independent antennas", already incorporated by reference above.

The information sought by the transmitter could also include information on the identity of the specific device, the battery level, and details on the battery and the device. The transmitter may collect the mobile devices' battery level, its identity, and device identifying information. With these communications, the transmitter may determine the direction of the other device and the distance.

Distance may be calculated using Receive Signal Strength Indicator (RSSI) and/or Time of Flight (ToF). The transmitter can modulate its power level depending on the distance to the between the mobile device and the transmitter.

In another embodiment, the transmitter does not turn on unless it detects a mobile device. The transmitter can continuously ping for the presence of a Bluetooth signal from the mobile device.

In another embodiment, the mobile device has an app that communicates with the transmitter. The transmitter can continuously search for the presence of the app and will then begin communicating with the phone via this interface. This will allow the user of the mobile device to control charge settings for the transmitter. If the transmitter detects the presence of the app, it will begin emitting FM signals to the mobile device for charging purposes.

The above embodiments do not require the mobile device to contain magnetic material, such as ferrite, relied on by other wireless charging systems.

C. Bedside Charger

Current wireless charging technology uses a charging pad or a charging base station. This requires the mobile device placed at a specific orientation or flush to the charging station. Additionally, existing wireless chargers use inductive power transfer, which require the base station and the mobile device to each have metal coils—a transmitter coil and a receiver coil, respectively. The transmitter's coil generates an electromagnetic field that induces a current in the receiver's coil.

Described herein has been a wireless charging system, method, and apparatus that uses a single turn, wire loop antenna in a mobile or other portable device that receives energy wirelessly from a charging station source external to the vehicle, such as from a Radio Frequency (RF) emitter. The RF emitter may transmit energy also using a single turn, wire loop antenna. The use of RF loop antennas to both transmit and receive power greatly reduces the need to precisely align the mobile device with a charging station. The arrangement thus has distinct advantages over conventional inductive charging systems that use inductive coils. Other arrangements of interest are more fully described in U.S. application Ser. No. 15/887,066, "ELECTRIC VEHICLE CHARGING VIA RF LOOPS TO AVOID NEED FOR PRECISE ALIGNMENT WITH WIRELESS CHARGING EQUIPMENT" and is fully incorporated herein.

In one embodiment, the charger is very small in design, about the size of a quarter and includes a includes a Radio Frequency (RF) signal generator, and a connection to a power source such as a connection to main line Alternating Current (AC) connection.

In another embodiment, the charger is larger and allows the user to place the mobile device, in any orientation, on or near the charger. The charger could be a pad or a thin sheet of material to add to a tabletop. The above embodiments do not require the mobile device to contain magnetic material, such as ferrite, relied on by other wireless charging systems.

C. Configurable Equipment

The preceding paragraphs are fully incorporated herein. The above described battery powered devices are configurable to handle all modes of polarization. The devices can be configured to have a switch to change the device from outdoor scavenging mode, whereby the antenna is scavenging outdoor FM signals, to indoor scavenging mode, where the device can be charged by indoor transmitters.

The foregoing description of example embodiments provides illustration and description of systems and methods for charging a device by scavenging power from ambient FM signals, but is not intended to be exhaustive or to limited to the precise form disclosed. For example, it should be understood that the embodiments described above may be implemented in many different ways. In some instances, the various "controller(s)" or "processors" described herein may each be implemented by a separate or shared physical or virtual general purpose computer having a central processor, memory, disk or other mass storage, communication interface(s), input/output (I/O) device(s), and other peripherals. The general purpose computer is transformed into the controllers and processors with improved functionality, and executes the processes described above to provide improved operations. The controllers and processors may operate, for example, by loading software instructions, and then executing the instructions to carry out the functions described.

As is known in the art, such a computer may contain a system bus, where a bus is a set of hardware lines used for data transfer among the components of a computer or processing system. The bus or busses are shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments of the components may therefore typically be implemented in hardware, firmware, software, or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing. By aggregating demand from multiple users in central locations, cloud computing environments can be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the circuit and block diagrams may include more or fewer elements, be arranged differently, or be represented differently. Other modifications and variations are possible in light of the above teachings. For example, while a series of steps has been described above with respect to the flow of operations, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

Also, the term "user", as used herein, is intended to be broadly interpreted to include, for example, a computer or data processing system or a human user of a computer or data processing system, unless otherwise stated.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. An apparatus for providing power to an electrical device, the power scavenged from ambient radio frequency energy, the apparatus comprising:
   at least one antenna element, disposed in a loop or in a portion of a loop;
   a detector, coupled to the antenna, for detecting radio frequency energy in a Frequency Modulation (FM) broadcast band, the detector further comprising an electric dipole mode detector and a magnetic dipole mode detector;

a controller, coupled to the detector, for providing an output indicating whether the electric dipole mode detector or the magnetic dipole mode detector provides a higher signal strength;

a rectifier, coupled to the controller, and selectively coupled to either the electric dipole mode detector or the magnetic dipole mode detector, depending on the output of the controller, for providing a direct current output; and a battery, coupled to be charged by the direct current output provided by the rectifier.

2. The apparatus of claim 1 wherein the antenna element is a rim of a vehicle wheel or a conductor disposed within a rim of a vehicle wheel.

3. The apparatus of claim 2 additionally comprising:
a capacitive coupler, disposed adjacent the vehicle wheel, to provide a capacitive connection to the detector.

4. The apparatus of claim 1 wherein
the antenna further comprises a pair of loops, each loop providing two output terminals;
the magnetic dipole mode detector further comprises a four port circuit, with two ports coupled to the two outputs of a first one of the antenna elements, and two other ports coupled to the two outputs of a second one of the antenna elements; and
the electric dipole mode detector further comprises a four port circuit, with two ports connected to a selected output of the first one of the antenna elements, and two other ports coupled to another selected output of the second one of the antenna elements.

5. The apparatus of claim 1 wherein the detector is tunable to different frequencies.

6. The apparatus of claim 1 additionally comprising:
a housing; and
wherein the antenna elements are provided by two or more metallic rods extending from the housing.

7. The apparatus of claim 1 wherein at least one of the antenna elements is provided by or within handlebars of a vehicle.

8. The apparatus of claim 2 wherein the detector is incorporated into an axle of the wheel.

9. The apparatus of claim 1 wherein the controller is additionally for selectively coupling the battery to the rectifier or to some other power source.

10. A method for scavenging power from one or more Frequency Modulation (FM) broadcast band signals, the method comprising:
receiving, via at least one antenna element having a loop shape or a portion of a loop shape, a received radio signal;
detecting the received radio signal including detecting an electric dipole mode signal and a magnetic dipole mode signal;
determining whether the electric dipole mode signal or the magnetic dipole mode signal has higher signal strength;
selectively generating a direct current output from either the electric dipole mode signal or the magnetic dipole mode signal, depending on which has the higher signal strength; and
charging an energy storage device by using the direct current output.

11. The method of claim 10 additionally comprising;
providing the antenna element as one or more of
a rim of a vehicle wheel;
a wire conductor disposed within a rim of a vehicle wheel; or
handlebars of a vehicle.

12. The method of claim 10 additionally comprising:
capacitively coupling to the antenna element at a location adjacent the vehicle wheel.

13. The method of claim 10 wherein the detecting step additionally comprises:
tuning to two or more frequencies within the FM band.

14. The method of claim 10 wherein the detecting is performed at a location adjacent an axle of a vehicle wheel.

15. The method of claim 10 additionally comprising:
selectively coupling the energy storage device to the direct current output or to some other power source.

* * * * *